No. 806,870. PATENTED DEC. 12, 1905.
J. H. BURNS.
DOUGH ROLLING APPARATUS.
APPLICATION FILED SEPT. 12, 1904.
7 SHEETS—SHEET 1.
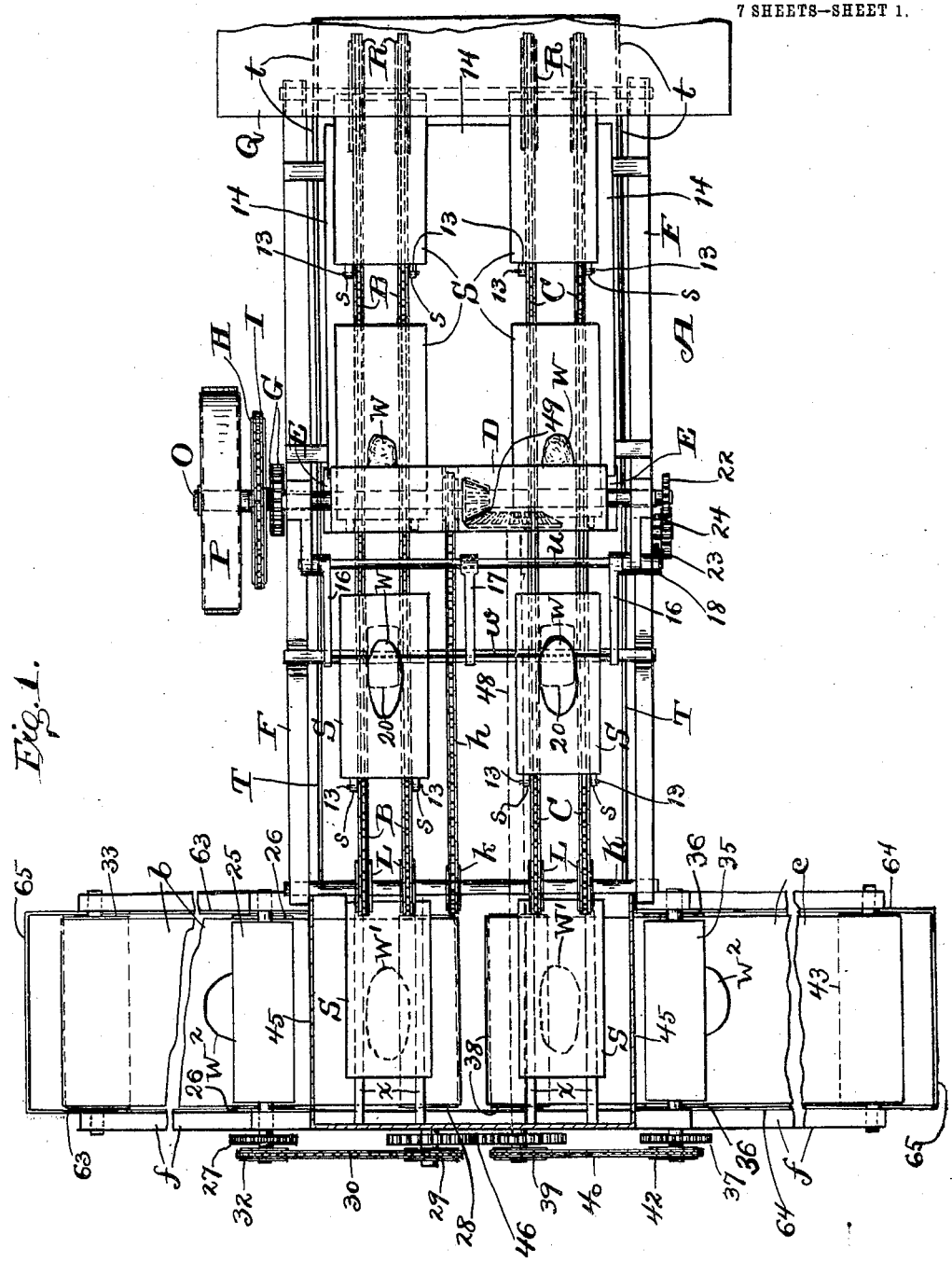
WITNESSES:
Daniel E. Daly.
Victor C. Lynch.
INVENTOR
Joseph H. Burns
BY
Lynch & Deven
his ATTORNEYS

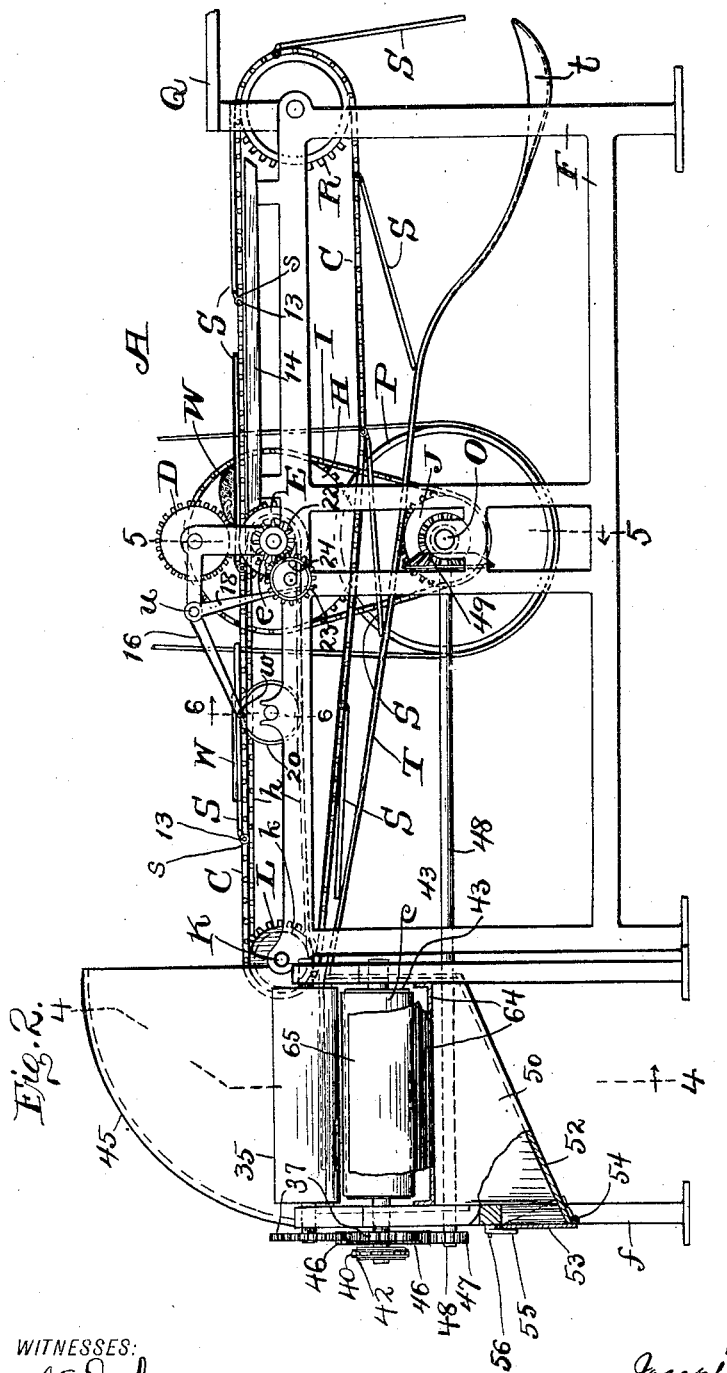

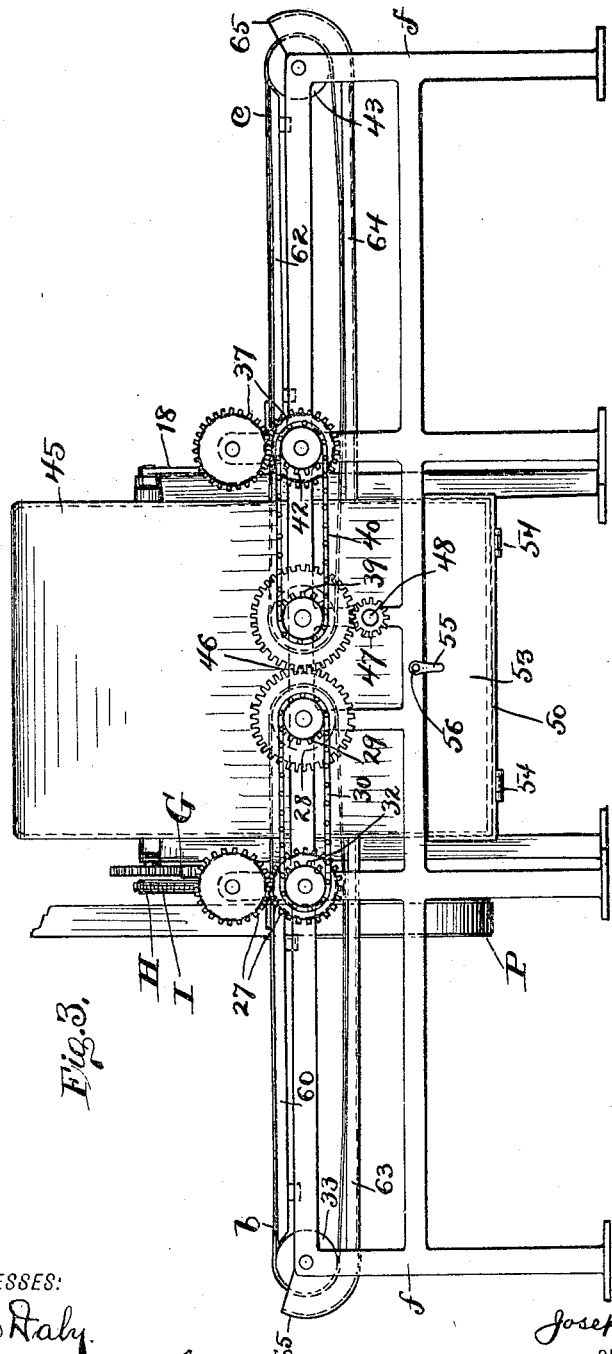

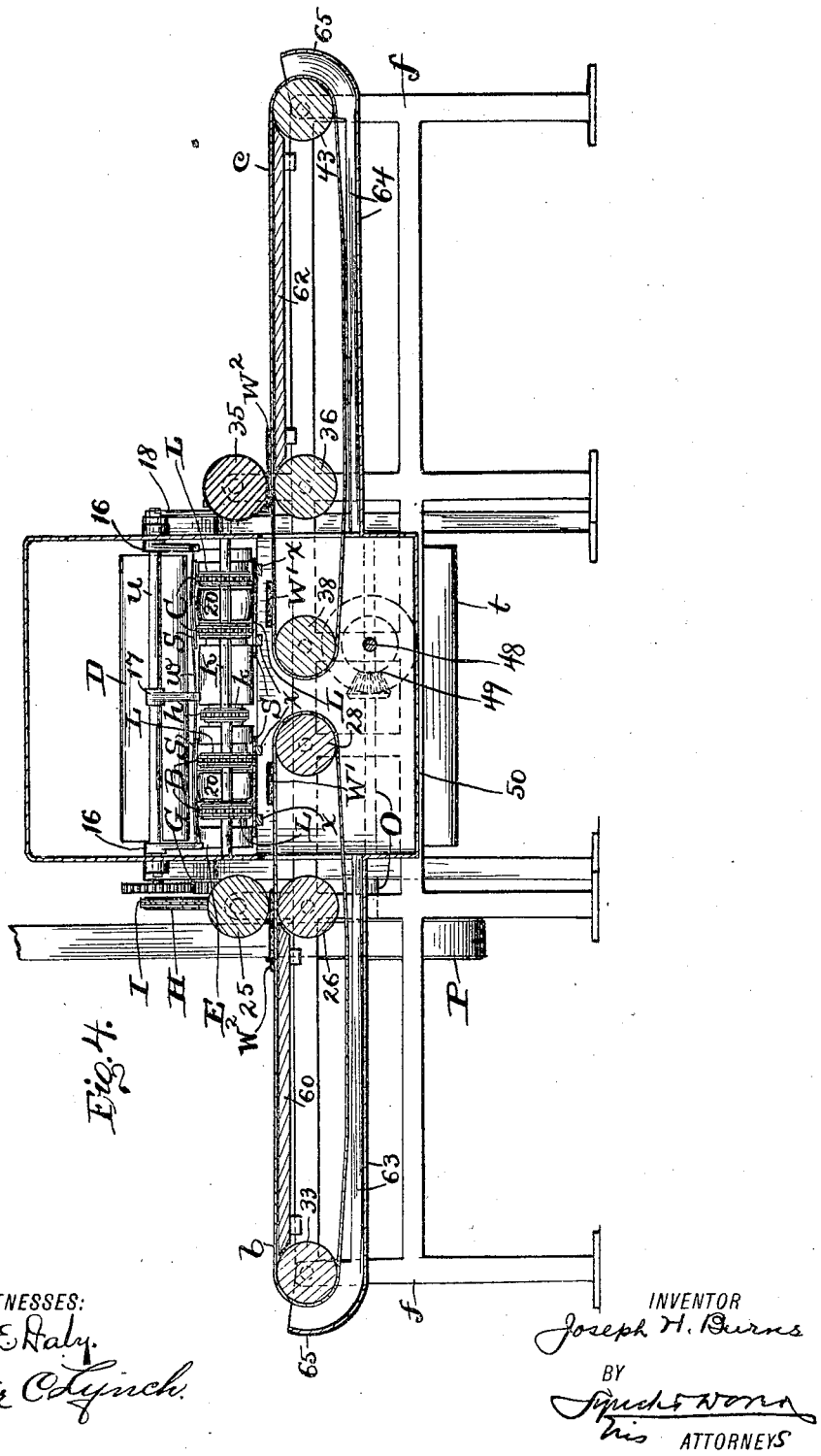

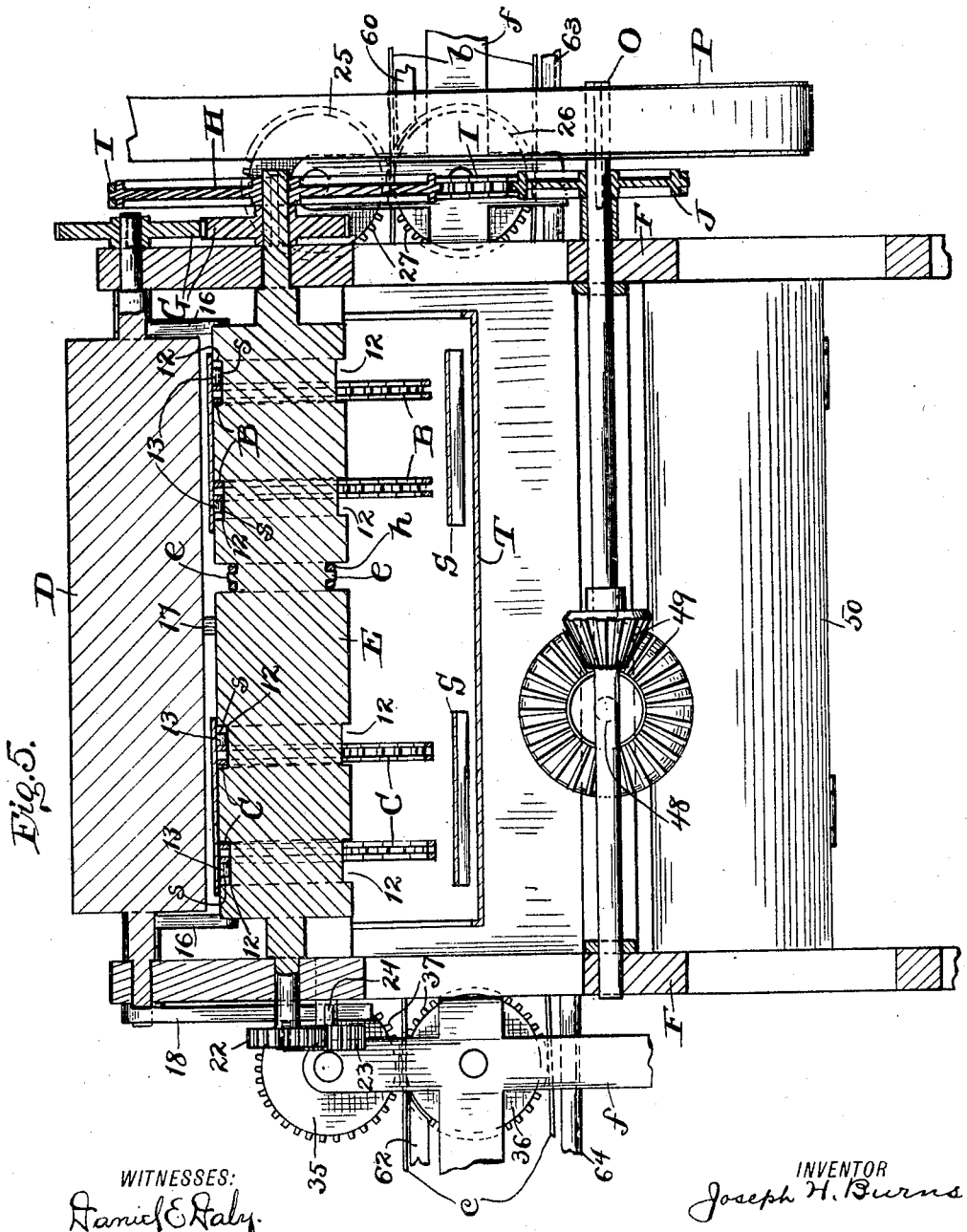

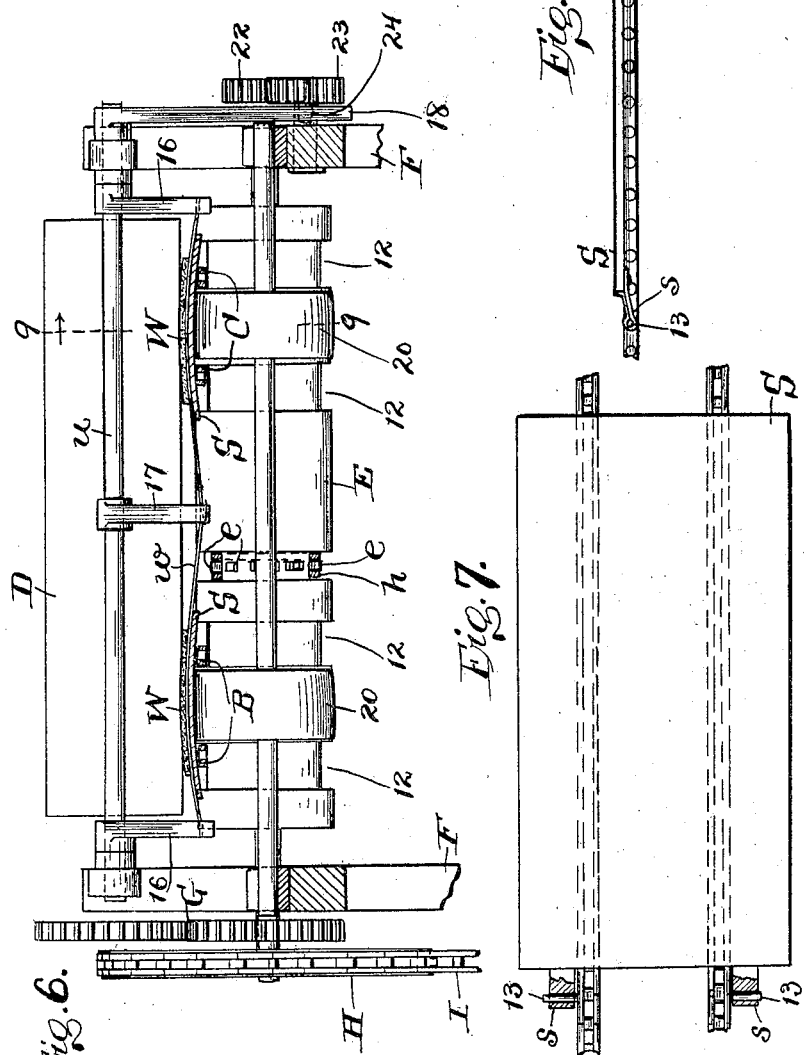

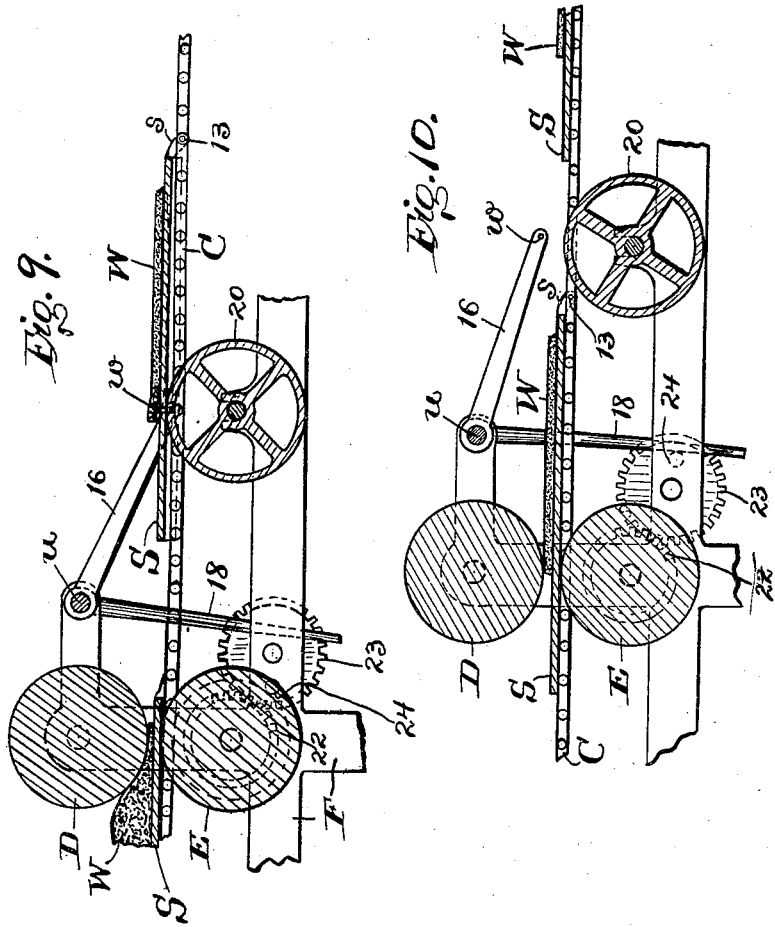

UNITED STATES PATENT OFFICE.

JOSEPH H. BURNS, OF CLEVELAND, OHIO.

DOUGH-ROLLING APPARATUS.

No. 806,870. Specification of Letters Patent. Patented Dec. 12, 1905.

Application filed September 12, 1904. Serial No. 224,095.

*To all whom it may concern:*

Be it known that I, JOSEPH H. BURNS, a citizen of the United States of America, residing at Cleveland, in the county of Cuyahoga and State of Ohio, have invented certain new and useful Improvements in Dough-Rolling Apparatus; and I hereby declare the following to be a full, clear, and exact description of the invention, such as will enable others skilled in the art to which it pertains to make and use the same.

This invention relates to improvements in dough-rolling or dough-spreading apparatus more especially designed for rolling or operating upon chunks or pieces of dough to form the bottoms and tops of pies by first flattening and forming each chunk or piece of dough into an oblong shape and then rolling or spreading the flattened and elongated piece of dough into an approximately circular shape or layer and not only overturning the elongated piece of dough between the aforesaid operations, but positively rendering the elongated piece of dough free to readily overturn without injury to the dough and without necessitating much, if any, flouring.

The object of this invention is to provide a machine of the character indicated whereby the bottoms and tops of pies can be made with great facility.

Another object is to prevent waste of flour and to materially lessen the amount of flour required in rolling dough to form pie-tops and pie-bottoms.

Another object is to construct a machine of the character indicated which is simple in construction and reliable in its operation and whose component parts are readily assembled and readily repairable when necessary.

With these objects in view and to realize other advantages hereinafter appearing this invention consists in certain features of construction and combinations of parts hereinafter described, and pointed out in the claims.

In the accompanying drawings, Figure 1 is a top plan of a machine or apparatus embodying my invention. Portions are broken away in this figure to reduce the size of the drawing. Figs. 2 and 3 are elevations taken at a right angle to each other and portions are broken away and in section in Fig. 2 to more clearly show the construction. Fig. 4 is an elevation in section on line 4 4, Fig. 2, looking in the direction indicated by the arrow. Fig. 5 is an elevation, largely in vertical section, on line 5 5, Fig. 2, looking in the direction indicated by the arrow. Fig. 6 is an elevation, largely in section, on line 6 6, Fig. 2, looking in the direction indicated by the arrow. Fig. 7 is a top plan, partly in section, of a portion of the apron-bearing conveyer; and Fig. 8 is a side elevation of the said portion of the said conveyer. Fig. 9 is a vertical section on line 9 9, Fig. 6, looking in the direction indicated by the arrow. Fig. 10 is a vertical section corresponding with Fig. 9 except as to the relative position of the parts. Figs. 5, 6, 9, and 10 are drawn on the same scale and on a larger scale than Figs. 1, 2, and 3; and Figs. 7 and 8 are drawn on a larger scale than Figs. 5, 6, 9, and 10.

My improved machine or apparatus comprises a table A, upon which chunks or pieces of dough are to be rolled and spread into an oblong shape. B and C indicate the chains of the different conveyers, respectively, of the said table. The said conveyers are arranged side by side and longitudinally of the table A, and the two chains of each of the said conveyers are parallel and arranged a suitable distance apart horizontally. The said conveyers are arranged a suitable distance apart laterally and in the same plane horizontally and actuated simultaneously in the same direction and in unison. Each of the said conveyers is provided with aprons S, which are arranged a suitable distance apart longitudinally of the chains of the respective conveyer, and are wide enough to rest upon both of the said chains and participate in forming the upper surface of the table A.

The table A comprises a pair of horizontal rolls, and D and E represent the upper roll and lower roll, respectively, of the said pair of rolls. The rolls D and E extend transversely of the table A at the upper side and lower side, respectively, of the upper and dough-feeding portions of the conveyers of the said table and are arranged at a right angle to the said conveyers. The rolls D and E are arranged in the same plane vertically, and the lower roll E forms a bottom bearing for the upper and dough-feeding portions of the conveyers of the table A. The pair of rolls D and E are shown arranged centrally between the ends of the table A. The rolls D and E are supported in any approved manner from the stationary framework F of the table A, and the lower roll E is grooved annularly and circumferentially, as at 12, to accommodate the location and operation of the chains B and C, as shown in Figs. 4, 5, and 6. The upper roll D is somewhat shorter than the lower roll E, and the said rolls are intergeared at one end with each other, as at G, so that the said rolls during their rotation turn in opposite directions, respectively, as required. A sprocket-wheel H (see Figs. 2 and 5) is operatively connected and arranged in line axially with the lower of the gears G, employed in establishing operative connection between the rolls D and E. The sprocket-wheel H is operatively connected by a chain I with the sprocket-wheel J, which is operatively mounted upon a shaft O, arranged below the conveyers of the table A and parallel with the rolls D and E. The shaft O is operatively provided with a driving-pulley P, to which power is applied in any approved manner.

The chains B and C of the conveyers of the table A lead at the dough-delivering end of the said table over diametrically corresponding sprocket-wheels L, which are operatively mounted on a horizontal shaft K, which is arranged transversely of the table A and parallel with the rolls D and E and supported from the framework F. The shaft K is operatively provided with a sprocket-wheel $k$, arranged between the conveyers of the table A and operatively connected by a chain $h$ with a sprocket-wheel formed integral with the lower roll E between the said conveyers by sprockets or peripheral projections $e$, formed upon and suitably spaced circumferentially of the said roll. (See Figs. 1, 4, 5, and 6.) It will be observed, therefore, that the rolls D and E and the conveyers of the table A are all operatively connected with the shaft O.

The chains B and C of the conveyers of the table A are provided at the outer side, as already indicated, with aprons S, spaced equidistantly and arranged longitudinally of the said conveyers. The spacing and arrangement of the aprons S of the chains B correspond exactly with the spacing and arrangement of the aprons S of the chains C, so that two aprons of the different conveyers, respectively, of the table A shall during the actuation of the said conveyers pass simultaneously between the rolls D and E.

Each apron S is horizontally pivoted at its forward end only to and transversely of the conveyer comprising the said apron. The pivotal attachment between each apron S and the chains bearing the said apron comprises, preferably, two ears $s$, with which the forward end of the apron is provided adjacent opposite sides or longitudinal edges, respectively, of the apron, which ears are arranged in line endwise with the chains between them and loosely embrace correspondingly-arranged pins or members 13, projecting laterally and outwardly from the chains, as shown very clearly in Fig. 7. It will be observed, therefore, that each apron S is capable of being swung in a vertical plane, as will hereinafter more clearly appear.

A stationary dough-supply table Q overhangs the dough-receiving end of the table A and is preferably supported from the framework F in any approved manner.

A chunk of dough to be rolled and spread is removed from the supply of dough (not shown) upon the table Q to and upon each apron S as the said apron during the actuation of the conveyers of the table A moves toward the rolls D and E from adjacent the table Q. A chunk of dough having been deposited upon an apron S preparatory to the feeding of the same to and in under the roll D is operated upon during its passage in under the said roll and rolled, and thereby spread longitudinally of the said apron, and consequently longitudinally of the conveyer comprising the said apron. Fig. 1 illustrates two pieces W of dough upon each of the conveyers of the table A, one of the said pieces of dough having begun to pass in under the roll D and the other of the said pieces of dough having been completely elongated upon the said table by the rolls D and E and shown moving toward the dough-delivering end of the table. In Fig. 1 an unladen apron S of each conveyer of the table A is shown moving into position in advance of the dough-supply table Q on its way toward the rolls D and E. Of course each apron S preparatory to the deposit thereon of a chunk of dough may be floured, and the said chunk of dough is floured on top preparatory to its passage under the roll D.

The aprons S are flexible and yet stiff enough to render them capable of swinging upwardly and forwardly from over the dough-delivering end of the said table during the passage of the said aprons around the driving sprocket-wheels L.

The chains B and C of the conveyers of the table A lead at the dough-receiving end of the said table over diametrically corresponding sprocket-wheels R, which (see Figs. 1 and 2) are arranged in line axially and suitably supported from the framework F.

By the construction hereinbefore described it is obvious that an apron S is readily removed from the chains bearing the said apron by pressing the said chains toward each other far enough to disengage their pins or projecting members 13 from the ears $s$ of the said apron.

To prevent the waste of any flour which may become displaced from the aprons S, a shallow trough T (see Figs. 1, 2, and 5) is provided below the conveyers of the table A, which trough extends from in under the dough-delivering end of the said table downwardly and toward the dough-receiving end of the said chamber and is dished downwardly, as at $t$, below the dough-receiving end of the table to form below the last-mentioned end of the table a receptacle in which flour falling into the said trough may accumulate and be readily removed. The receptacle $t$ extends, preferably, in under the dough-supply table Q. The trough T has, furthermore, such arrangement relative to the conveyers of the table A that the aprons S of the said conveyers shall drag upon the bottom of the said trough during their movement from below the dough-delivering end of the said table toward and over the dish-shaped end $t$ of the trough below the dough-receiving end of the table. The aprons S in dragging upon the bottom of the trough T sweep flour into the dish-shaped end $t$ of the trough. The inclined trough also acts as a guard to protect the apron S from below.

The table A is preferably provided next below the upper and dough-feeding portions of the conveyers of the said table and between the lower roll E and the dough-receiving end of the said table, with a horizontally-arranged bed 14, which (see Figs. 1 and 2) is supported from the framework F and arranged to prevent sagging of the said portions of the said conveyers. The bed 14 preferably extends into close proximity to the roll E. By the provision of the bed 14 in the place indicated there is no liability of the derangement of any of the parts by a forcible throwing or depositing of chunks or pieces of dough upon the aprons S during their passage from in front of the dough-supply table Q to the roll D.

Two endless conveyers $b$ and $c$ are arranged adjacent to the dough-delivering end of the table A and at a right angle to the said table. The relative arrangement of the parts is such that a dough-laden apron S, attached to the chains B of one of the conveyers of the table A, shall, in turning over during its passage around the sprocket-wheels L, driving the said chains, deliver the dough upon the said apron onto the conveyer $b$, and a dough-laden apron S, attached to the chains C of the other conveyer of the table A, shall, in turning over during its passage around the sprocket-wheels L, driving the said chains, deposit the dough thereon onto the conveyer $c$.

The conveyers $b$ and $c$ are driven in any approved manner. The arrangement of the parts is preferably furthermore such that the upper and dough-feeding portions of the conveyers $b$ and $c$ are arranged in a horizontal plane and at an elevation a suitable distance below the upper and dough-feeding portions of the conveyers of the table A.

Obviously the conveyers of the table A are actuated in the direction required to feed dough rolled thereon to the conveyers $b$ and $c$, and the latter are actuated in the direction required to feed the dough delivered thereon away from the table A. Figs. 1 and 2 illustrate the delivery of two elongated pieces W' of dough from the different conveyers, respectively, of the table A to the conveyers $a$ and $b$, respectively.

Obviously the dough-laden aprons of the conveyers of the table A in swinging from over the said conveyers toward and over the conveyers $b$ and $c$ overturn their load—elongated chunks of dough, as already indicated—and deposit the same onto and transversely of the conveyers $b$ and $c$ and at a right angle to the travel of the said last-mentioned conveyers.

It is obviously desirable to wholly or largely dispense with the flouring of the dough in preventing the sticking of the dough to the dough-laden aprons S, and means employed for rendering the dough positively loose relative to the dough-bearing aprons preparatory to the delivery of the dough to the conveyers $b$ and $c$ comprises, preferably, a fine strand $w$—such, for instance, as a piece of thin steel wire—which is arranged over and extends transversely of both conveyers of the table A and rendered operative preparatory to the simultaneous swinging of two dough-laden aprons from the different conveyers, respectively, of the table A onto the conveyers $b$ and $c$, respectively. The strand $w$ is arranged at any suitable point between the roll D and the dough-delivering end of the table A, as shown in Figs. 1, 2, 4, and 6. The strand $w$ is borne, preferably, (see Figs. 1 and 6) by three arms 16, 16, and 17 of an oscillating shaft $u$, which is arranged horizontally and parallel with the roll D, between the said roll and the dough-delivering end of the table A and a suitable distance above the conveyers of the said table. The shaft $u$ extends beyond the outer sides of the conveyers of the table A and is suitably supported from the framework F. The arrangement of the parts is such that the strand $w$ extends to and transversely of both conveyers of the table A and a suitable distance beyond the outer sides of the said conveyers and is secured at its ends to the arms 16, which are fixed upon opposite ends, respectively, of the shaft $u$ and project from the shaft downwardly and in the direction of the dough-delivering end of the table A. The arm 17 is fixed upon the shaft $u$ centrally between the ends of the said shaft, and consequently arranged between the conveyers of the table A, and projects from the said shaft downwardly and in the direction of the dough-delivering end of the table A. The central shaft-arm 17 is heavy enough to act as a weight in preventing upward displacement of the strand $w$ centrally between its ends. The thickness of the strand $w$ is exaggeratively shown in the drawings.

The aprons S of the upper and dough-feeding portions of the conveyers of the table A pass during the actuation of the said conveyers over the peripheral surface of rollers or wheels 20, free to turn and supported from the framework F in any approved manner—that is, a roller 20 is arranged next below the dough-feeding portion of each conveyer of the table A in under and longitudinally of the strand *w* and preferably arranged with its axis in the same plane vertically with the said strand.

The roll E is intergeared at one end with the roll D, as already indicated, and its other end (see Figs. 1, 2, 5, 6, 9, and 10) is operatively provided with a spur-gear 22, which meshes with a spur-gear 23, supported from the framework F and arranged with its axis between the gear 22, and an arm 18, depending from and fixed to the strand-actuating shaft *u*. The arm 18 normally depends below the axis of the gear 23, which is provided, preferably at its inner side, with an inwardly-projecting pin or member 24, arranged to engage the said arm during the rotation of the said gear and thereupon swing the arm in the direction of the dough-delivering end of the table A, and thereby result in lifting the strand *w*.

The rollers 20 are arranged to afford bearing, as already indicated, to the dough-laden aprons S during the passage of the said aprons over the said rollers on their way to the conveyers *b* and *c* and directly below the strand *w*. The said rollers are also arranged high enough to somewhat lift the said aprons during the passage of the aprons over the said rollers, as shown in Figs. 6 and 9. The rollers 20 preferably have convex peripheries, and the aprons S and strand *w* when curved upwardly by the said rollers during the passage of the aprons over the rollers conform to the curvature of the said rollers.

The gear 23 is enough larger in diameter, and consequently has a sufficient number of teeth in excess of the number of teeth of the gear 22, and the arrangement and operation of the parts and the length of the arm 18 of the shaft *u* are such that the shaft-arms 16, 16, and 17 and the connected strand *w* shall upon the passage of the dough of two aprons S of the different conveyers, respectively, of the table A over the said strand be actuated and held above the path of the elongated pieces of dough carried by the apron S long enough to enable the passage of the next succeeding dough-laden aprons of the said conveyers in under the said strand; that the shaft-arm 18 shall be released by the pin or projecting member 24 of the gear 23 as soon as the last-mentioned aprons have commenced to pass in under the strand *w* and before the dough upon the said aprons has entered the sweep of the strand, so as to result in the said strand dropping by the gravity of the shaft-arms 16, 16, and 17 into its lower position, wherein the strand is operative and rests upon the said aprons; that in the lower and operative position of the strand *w* the shaft-arm 18, as hereinbefore described, depends into the path of the pin or projecting member 24 of the gear 23; that the aprons S are curved upwardly somewhat by the rollers 20 during the passage of the said aprons over the said rollers, so as to cause the strand *w* to bear somewhat downwardly upon the said aprons; that the shaft-arms 16, 16, and 17 will yield sufficiently to accommodate a curvature of the strand *w*; that the strand *w* shall positively loosen the dough upon the aprons S relative to the said aprons, and the dough thus loosened relative to the said aprons will pass over the strand *w* during the passage of the aprons toward the conveyers *b* and *c*, and that the close engagement of the strand *w* with the dough-laden aprons during the loosening of the dough by the said strand from the aprons prevents injury to the dough by the strand.

Figs. 6 and 9 illustrate the loosening of the dough upon dough-laden aprons S relative to the aprons by the strand *u*.

Fig. 10 illustrates the holding of the strand *u* elevated, and consequently inoperative, during the interval of time between the passage of two successive dough-laden aprons under the strand.

The conveyers *b* and *c* extend adjacent to the dough-delivering end of the table A and are arranged in position to receive dough swung from the said table by the aprons S of the different conveyers, respectively, of the said table. The conveyers *b* and *c* are supported in any approved manner from stationary framework *f*.

To prevent the aprons S of the conveyer of the table A from flapping against the conveyers *b* and *c* during the delivery of partially-rolled dough from the table A onto the said conveyers, the stationary framework *f* (see Figs. 1 and 4) is provided over the dough-receiving portion of the conveyer *c*, as well as over the dough-receiving portion of the conveyer *b*, with two cross-bars *x*, which are rigid at both ends with the said framework and are arranged horizontally and at a right angle to the said conveyers. The bars *x* are arranged such a distance apart longitudinally of the conveyers *b* and *c* and in such position relative to the conveyers of the table A that each apron S shall upon swinging from over the table A flap against a pair of bars *x*, so that any partially-rolled dough carried by the said apron shall be overturned and drop between the bars of the said pair of bars onto the conveyer below the said pair of bars. It will be observed, therefore, that the arrangement of the parts is such that two chunks or pieces of dough simultaneously elongated upon the different conveyers, respectively, of the table A are delivered from the said table to and crosswise of the different conveyers *b* and *c*, respectively, and each apron S upon striking against bars *x* is during the actuation of the conveyers of the table A removed from over the said bars into and along the trough T.

Two rolls 25 and 26 (see Figs. 1 and 4) extend transversely of the upper side and lower side, respectively, of the upper and dough-feeding portion of the conveyer *b* and are arranged horizontally and at a right angle to the said conveyer in suitable proximity to the dough-receiving portion of the said conveyer. The rolls 25 and 26 are arranged in the same plane vertically. The lower roll 26 forms a bottom-bearing for the upper and dough-feeding portion of the conveyer *b*. The rolls 25 and 26 are suitably supported from the framework *f* and are intergeared with each other, as at 27, (see Fig. 3,) so that the said rolls during their rotation turn in opposite directions, respectively, as required. The conveyer *b* leads adjacent the dough-delivering end of the table A over a roller 28, supported from the framework *f*. The roller 28 is obviously arranged parallel with the rolls 25 and 26 and operatively provided at one end with a sprocket-wheel 29, which is operatively connected by a chain 30 with a sprocket-wheel 32, arranged in line axially with and attached to the roll 26. It will be observed, therefore, that power is transmitted to the rolls 25 and 26 from the roller 28. The conveyer *b* leads over a suitably-supported guide-roller 33, arranged a suitable distance beyond the outer sides of the rolls 25 and 26.

Two rolls 35 and 36 extend transversely of the upper side and lower side, respectively, of the upper and dough-feeding portion of the conveyer *c* and are arranged horizontally and at a right angle to the said conveyer in suitable proximity to the dough-receiving portion of the said conveyer. The rolls 35 and 36 are arranged in the same plane vertically. The lower roll 36 forms a bottom bearing for the upper and dough-feeding portion of the conveyer *c*. The rolls 35 and 36 are suitably supported from the framework *f* and are intergeared with each other, as at 37, (see also Fig. 3,) so that the said rolls during their rotation turn in opposite directions, respectively, as required. The conveyer *c* leads adjacent the dough-delivering end of the table A over a roller 38, supported from the framework *f*. The roller 38 is obviously arranged parallel with the rolls 35 and 36 and operatively provided at one end with a sprocket-wheel 39, which is operatively connected by a chain 40 with a sprocket-wheel 42, arranged in line axially with and attached to the roll 36. It will be observed, therefore, that power is transmitted to the rolls 35 and 36 from the roller 38. The conveyer *c* leads over a suitably-supported guide-roller 43, arranged a suitable distance beyond the outer sides of the rolls 35 and 36.

A hood 45 (see Figs. 1, 2, 3, and 4) is arranged over the dough-receiving portions of the conveyers *b* and *c* and is open adjacent the conveyers of the table A to accommodate the passage of dough from the last-mentioned conveyers onto the conveyers *b* and *c*. The rollers 28 and 38 externally of the said hood 45 are intergeared, as at 46, (see Figs. 1 and 3,) so that the said rollers rotate in opposite directions, respectively. One of the gears employed in establishing operative connection between the rollers 28 and 38 meshes (see also Fig. 2) with a pinion 47, operatively mounted on a shaft 48, arranged horizontally at an elevation below the conveyers *b* and *c*, which shaft extends in under and longitudinally of the trough T and is intergeared, as at 49, below the said trough with the shaft O.

I would here remark that the trough T also serves as a guard to prevent the aprons S from becoming entangled with the gearing 49.

The hood 45 prevents the waste of any flour scattered or displaced by the swinging of the aprons S from over the table A onto the bars *x*, and any flour scattered or displaced over the dough-receiving portions of the conveyers *b* and *c* and not settling upon the said conveyers gravitates or settles into a receptacle 50, arranged below the hood 45 and in under the said portions of the said conveyers, (see Figs. 2, 3, and 4,) which receptacle has an inclined bottom 52 and is provided at the lower end of the said bottom with a door 53, which is hinged, as at 54, to the said bottom and affords access to the chamber of the said receptacle. The door 53 is held in its closed position by a latch 55, pivoted, as at 56, to the framework *f*. Upon swinging the latch 55 to render it inoperative the door 53 is rendered free to be opened to accommodate the removal of flour which has settled or accumulated within the receptacle 50.

The parts are so arranged and timed that two partially-rolled and elongated pieces of dough simultaneously delivered from the table A to and crosswise of the conveyers *b* and *c*, respectively, are fed by the latter to and in under the rolls 25 and 35, where the said pieces of dough are spread into approximately circular layers. Fig. 1 of the drawings illustrates the operation upon elongated pieces of dough W$^2$ under the rolls 35 and 36.

By the construction and arrangement of parts hereinbefore described pie-bottoms and pie-tops can be simultaneously rolled. For instance, if the conveyer *b* and the conveyer comprising the chains B were used in feeding dough to form pie-bottoms then the conveyer *c* and the conveyer comprising the chains C would be advantageously used in feeding dough to form pie-tops.

The framework *f* is provided next below the upper and dough-feeding portion of the conveyer *b* and between the lower roll 26 and the guide-roller 33 with a horizontally-arranged bed 60, which (see Fig. 4) is arranged to prevent sagging of the said portion of the said conveyer. The bed 60 preferably extends into close proximity to the roll 26 and to the roller 33.

The framework *f* is provided next below the upper and dough-feeding portion of the conveyer *c* and between the lower roll 36 and the guide-roller 43 with a horizontally-arranged bed 62, which (see Fig. 4) is arranged to prevent sagging of the said portion of the said conveyer. The bed 62 preferably extends into close proximity to the roll 36 and to the roller 43.

To catch any flour displaced from the conveyers *b* and *c*, two troughs 63 and 64 (see Figs. 1, 2, 3, and 4) are arranged below and extend longitudinally of the different conveyers *b* and *c*, respectively. The troughs 63 and 64 are preferably somewhat wider than the conveyers *b* and *c*, respectively, and communicate at their inner ends with the receptacle 50. Any flour settling within the troughs 63 and 64 can be readily brushed or removed from the said troughs into the receptacle 50. The troughs 63 and 64 are supported from the framework *f* and enlarged upwardly at their outer end, as at 65, at the outer side of the guide-roller 33 and guide-roller 43, respectively.

What I claim is—

1. In dough-rolling apparatus, a dough-rolling table comprising a dough-feeding conveyer consisting of two parallel endless chains arranged side by side and a suitable distance apart laterally and dough-receiving aprons spaced longitudinally of the conveyer and attached to the chains, of a flour-collector arranged below and longitudinally of the conveyer and in position to catch flour dropping from or falling between the aprons.

2. In dough-rolling apparatus, the combination, with a dough-rolling table comprising two dough-feeding conveyers arranged side by side and a suitable distance apart laterally, and means for actuating the conveyers, of a dough-supply table overhanging the said conveyers at the dough-receiving end of the dough-rolling table, and a trough arranged in under both conveyers and extending longitudinally of the conveyers, which trough declines in the direction of the dough-receiving end of the dough-rolling table and terminates in a dish-shaped portion below the dough-supply table.

3. In combination, a dough-rolling table comprising an endless dough-feeding conveyer arranged longitudinally of the table and provided at its outer side with dough-receiving aprons arranged at suitable intervals longitudinally of the conveyer, which aprons are attached only at their forward ends to the conveyer; a trough arranged in under the conveyer and declining from in under the dough-delivering end of the table and arranged in such proximity to the conveyer that the aprons during their return from the dough-delivering end to the dough-receiving end of the table shall make contact at their free ends with the bottom of the trough.

4. In combination, two diametrically corresponding sprocket-wheels arranged in line axially and in the same plane horizontally; a dough-supply table arranged a suitable distance from the said sprocket-wheels; endless chains operatively engaging the sprocket-wheels and instrumental in forming an endless conveyer arranged to convey dough from the dough-supply table to the aforesaid dough-rolling table; dough-receiving aprons arranged at suitable intervals longitudinally of the chains and wide enough to rest upon both chains, which aprons are attached at their forward ends to the chains, and a pair of dough-rolling rolls arranged at and transversely of the upper side and lower side respectively of the upper and dough-feeding portion of the conveyer.

5. In combination, a dough-supply table; an endless conveyer arranged to convey dough from the dough-supply table; a pair of intergeared dough-rolling rolls arranged at and transversely of the upper side and lower side respectively of the upper and dough-feeding portion of the conveyer; a flour-collector arranged in under and longitudinally of the conveyer; a driving-shaft in under the trough, and an operative connection between the said shaft and one of the aforesaid rolls.

6. In combination, two dough-feeding conveyers arranged side by side and provided with dough-carrying aprons, with the aprons of both conveyers correspondingly spaced longitudinally of the conveyers; dough-rolling means arranged to operate upon two pieces of dough placed upon adjacent aprons of the different conveyers respectively; a shiftable strand arranged above and transversely of the travel of the aprons and in position to loosen the dough relative to the aprons in the lower position of the strand; a shaft capable of oscillation and arranged transversely of both conveyers, which shaft is provided with an arm arranged centrally between the ends of the shaft and two arms arranged at opposite ends respectively of the shaft, which arms all participate in supporting the strand, and means for oscillating the shaft in the direction and to the extent required to elevate the strand and thereby render the strand inoperative.

7. In combination, two dough-feeding conveyers arranged side by side; dough-rolling means arranged to operate upon two pieces of dough placed upon adjacent portions of the different conveyers respectively; a shiftable strand arranged above and transversely of the upper and dough-feeding portions of the conveyers and in position to loosen the dough relative to the conveyers in the lower position of the strand; a shaft capable of oscillation and arranged a suitable distance above and transversely of both conveyers between the strand and the dough-rolling means, which shaft is provided with a depending arm arranged centrally between the ends of the shaft and two depending arms arranged at opposite ends respectively of the shaft, which arms all participate in supporting the strand, and means for oscillating the shaft in the direction and to the extent required to elevate the strand and thereby render the strand inoperative.

8. In dough-rolling apparatus, the combination, with a dough-rolling table comprising two endless dough-feeding conveyers arranged side by side and a suitable distance apart laterally, of two endless conveyers arranged to receive dough from the different conveyers respectively of the aforesaid table; a hood arranged over the adjacent dough-receiving portions of the second-mentioned conveyers, and a flour-collector arranged below the said portions of the second-mentioned conveyers.

9. The combination, with a dough-rolling table comprising two endless dough-feeding conveyers arranged side by side and a suitable distance apart laterally, and two endless conveyers arranged to receive dough from the different conveyers respectively of the aforesaid table, of a hood arranged over the adjacent dough-receiving portions of the second-mentioned conveyers; a receptacle arranged vertically below the hood and in under the adjacent portions of the second-mentioned conveyers, which receptacle has a declining bottom.

10. The combination, with a dough-rolling table comprising two endless dough-feeding conveyers arranged side by side and a suitable distance apart laterally, and two endless conveyers arranged to receive dough from the different conveyers respectively of the aforesaid table, of a hood arranged over the adjacent dough-receiving portions of the second-mentioned conveyers; a receptacle arranged vertically below the hood and in under the adjacent portions of the second-mentioned conveyers, and troughs arranged in under and longitudinally of the second-mentioned conveyers and in position to catch flour displaced from the said conveyers, which troughs communicate with the aforesaid receptacle.

11. In dough-rolling apparatus, the combination with a dough-rolling table, and an endless conveyer arranged to receive dough from one end of the aforesaid table, of a hood arranged over the dough-receiving portion of the conveyer, and a flour-collector below the hood and below the said portion of the conveyer.

12. The combination, with a dough-rolling table, and an endless conveyer arranged to receive dough from one end of the table, of a hood arranged over the dough-receiving portion of the conveyer and open adjacent the aforesaid table to accommodate the delivery of dough from the table onto the conveyer, and a receptacle arranged vertically below the hood and in position to catch flour displaced over or from the aforesaid portion of the conveyer.

13. The combination, with a dough-rolling table, and an endless conveyer arranged to receive dough from one end of the table, of a hood arranged over the dough-receiving portion of the conveyer and open adjacent the aforesaid table to accommodate the delivery of dough from the table onto the conveyer; a receptacle arranged vertically below the hood and below the aforesaid portion of the conveyer, and a trough arranged in under and longitudinally of the conveyer and in position to catch flour falling from the conveyer, which trough connects with and communicates with the aforesaid receptacle.

14. The combination, with a dough-rolling table, and an endless conveyer arranged to receive dough from one end of the table, of a hood arranged over the dough-receiving portion of the conveyer and open adjacent the aforesaid table to accommodate the delivery of dough from the table onto the conveyer, and means for overturning dough rolled on the table onto the conveyer within the hood.

15. In dough-rolling apparatus, the combination with a dough-rolling table comprising two endless dough-feeding conveyers arranged side by side and a suitable distance apart laterally, and two endless conveyers arranged to receive dough from the different conveyers respectively of the aforesaid table, of a hood arranged over the adjacent dough-receiving portions of the second-mentioned conveyers and open adjacent the aforesaid table, and means whereby dough is delivered simultaneously from the first-mentioned conveyers to the second-mentioned conveyers respectively within the hood and turned over during the delivery of the dough.

16. In dough-rolling apparatus, the combination with a dough-rolling table, of two endless conveyers arranged to receive dough from the table and feed the dough laterally of the table in different directions respectively, which conveyers are intergeared adjacent the dough-delivering end of the said table, a shaft provided with a pinion meshing with one of the gears establishing operative connection between the conveyers, and means for driving the shaft.

17. The combination, with a dough-rolling table comprising an endless conveyer provided with aprons spaced longitudinally of the conveyer, which aprons are attached to the conveyer at their forward end only and arranged to swing from over the said table at the dough-delivering end of the table, and a pair of rolls arranged at and transversely of the upper side and lower side respectively of the upper and dough-feeding portion of the conveyer, and a driving-shaft arranged a suitable distance below the conveyer and operatively connected with the rolls, of another conveyer arranged to receive dough from the aprons of the first-mentioned conveyer when the said aprons are overturned at the dough-delivering end of the aforesaid table; a shaft operatively connected with the second-mentioned conveyer and intergeared with the aforesaid driving-shaft, and a guard arranged to prevent the aforesaid aprons from making contact with the intergeared shafts during the travel of the aprons from the dough-delivering end to the dough-receiving end of the aforesaid table.

18. The combination, with a dough-rolling table comprising an endless conveyer provided with aprons spaced longitudinally of the conveyer, which aprons are attached to the conveyer at their forward ends only and arranged to swing from over the said table at the dough-delivering end of the table, and another conveyer arranged to receive dough from the aprons of the first-mentioned conveyer when the said aprons are overturned at the dough-delivering end of the aforesaid table, of two shafts arranged and intergeared a suitable distance below the first-mentioned conveyer; operative connections between the different shafts and the different conveyers respectively, and means for preventing the aforesaid aprons from making contact with the gearing between the shafts during the travel of the aprons from the dough-delivering end to the dough-receiving end of the aforesaid table.

In testimony whereof I sign the foregoing specification, in the presence of two witnesses, this 30th day of August, 1904, at Cleveland, Ohio.

JOSEPH H. BURNS.

Witnesses:
  C. H. DOVER,
  B. C. BROWN.